(12) United States Patent
Patronas et al.

(10) Patent No.: US 11,711,318 B1
(45) Date of Patent: Jul. 25, 2023

(54) PACKET SWITCHES

(71) Applicant: MELLANOX TECHNOLOGIES, LTD., Yokneam (IL)

(72) Inventors: Ioannis (Giannis) Patronas, Piraeus (GR); Michael Gandelman, Haifa (IL); Liron Mula, Hertzlia (IL); Aviad Levy, Ge'alya (IL); Lion Levi, Yavne (IL); Jose Yallouz, Kibbutz Sha'ar HaAmakim (IL); Paraskevas Bakopoulos, Ilion (GR); Elad Mentovich, Tel Aviv (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 17/648,260

(22) Filed: Jan. 18, 2022

(30) Foreign Application Priority Data

Jan. 12, 2022 (GR) .............................. 20220100024

(51) Int. Cl.
*H04L 49/00* (2022.01)
*H04L 49/101* (2022.01)
(52) U.S. Cl.
CPC ........ *H04L 49/3027* (2013.01); *H04L 49/101* (2013.01); *H04L 49/3018* (2013.01)

(58) Field of Classification Search
None
See application file for complete search history.

(56) References Cited

U.S. PATENT DOCUMENTS 10,701,002 B1 * 6/2020 Schroder ............. H04L 47/2441
2002/0174316 A1 * 11/2002 Dale ....................... G06F 9/544
711/170

\* cited by examiner

*Primary Examiner* — Alex Skripnikov
(74) *Attorney, Agent, or Firm* — Moore & Van Allen PLLC; Michael M. McCraw

(57) ABSTRACT

Switches for performing packet switching and associated methods are provided. An example switch includes an ingress port for receiving a packet. The switch includes a plurality of egress ports for discharging the packet from the switch. The switch includes a plurality of egress queues with each egress queue associated with one of the plurality of egress ports. The switch includes a control plane configured to determine a descriptor associated with a packet, determine a first egress port from which to discharge the at least one packet and to transmit the descriptor to an egress queue associated with the first egress port. The switch includes a descriptor crossbar configured to transmit the descriptor from the egress queue to a second egress port of the plurality of egress ports. The switch includes a packet crossbar configured to transmit the at least one packet from the ingress port to the second egress port.

30 Claims, 7 Drawing Sheets

PACKET SWITCHES

CROSS-REFERENCE TO RELATED APPLICATIONS

This application claims priority to Greek Patent Application No. 20220100024, filed Jan. 12, 2022, the content of which is hereby incorporated by reference herein in its entirety.

TECHNOLOGICAL FIELD

Example embodiments of the present disclosure relate generally to packet switching and, more particularly, to altering the egress port from which a packet is discharged after queueing.

BACKGROUND

In computer networks, packets of data may be transmitted from one device to another via a switch. Applicant has identified a number of deficiencies and problems associated with present switches and methods of switching that result in switch congestion, packet dropping, and latency. Through applied effort, ingenuity, and innovation, many of these identified problems have been solved by developing solutions that are included in embodiments of the present disclosure, many examples of which are described in detail herein.

BRIEF SUMMARY

In an embodiment an apparatus is provided. In some embodiments, the apparatus may include an ingress port configured to receive at least one packet. In some embodiments, the at least one packet may include data and a header. In some embodiments, the apparatus may include a plurality of egress ports in communication with the ingress port with each egress port configured to discharge the at least one packet. In some embodiments, the apparatus may include a plurality of egress queues. In some embodiments, each egress queue is associated with one of the plurality of egress ports. In some embodiments, the apparatus may include a control plane in communication with the ingress port and the plurality of egress queues and configured to receive the header from the ingress port. In some embodiments, the control plane may be configured to (1) determine a descriptor associated with the at least one packet based on the header, (2) determine a first egress port of the plurality of egress ports from which to discharge the at least one packet, and (3) transmit the descriptor to an egress queue associated with the first egress port In some embodiments, the apparatus may include a descriptor crossbar in communication with the egress queue and the plurality of egress ports configured to transmit the descriptor from the egress queue to a second egress port of the plurality of egress ports. In some embodiments, the apparatus may include a packet crossbar in communication with the ingress port and the plurality of egress ports. In some embodiments, the packet crossbar may be configured to transmit the at least one packet from the ingress port to the second egress port.

In some embodiments, the apparatus may include a buffer configured to store the at least one packet.

In some embodiments, each egress queue is configured to store the descriptor for a first amount of time.

In some embodiments, the second egress port is the first available egress port of the plurality of egress ports.

In some embodiments, the descriptor crossbar operates at a capacity that is less than line rate.

In another embodiment, a method is provided. In some embodiments, the method includes receiving at least one packet via an ingress port with the at least one packet comprising data and a header. In some embodiments, the method includes determining a first egress port of a plurality of egress ports to which the at least one packet will be transmitted. In some embodiments, the method includes determining a descriptor associated with the at least one packet based on the header. In some embodiments, the method includes transmitting the descriptor to a first egress queue associated with a first egress port. In some embodiments, the method includes transmitting the descriptor through a descriptor crossbar such that the descriptor is routed to a second egress port. In some embodiments, the method includes transmitting the at least one packet through a packet crossbar such that the at least one packet is routed to the second egress port.

In some embodiments, the descriptor crossbar operates at a capacity that is less than line rate.

In some embodiments, each egress queue is configured to store the descriptor for a first amount of time.

In some embodiments, the second egress port is the first available egress port of the plurality of egress ports.

In yet another embodiment, another apparatus is provided. In some embodiments, the apparatus includes an ingress port configured to receive at least one packet with the at least one packet comprising data and a header. In some embodiments, the apparatus includes a plurality of egress ports in communication with the ingress port with each egress port configured to discharge the at least one packet. In some embodiments, the apparatus includes a plurality of egress queues in communication with the plurality of egress ports. In some embodiments, each egress queue is associated with one of the plurality of egress ports. In some embodiments, the apparatus includes a control plane in communication with the ingress port and the plurality of egress queues, and configured to receive the header from the ingress port. In some embodiments, the control plane is configured to (1) determine a plurality of descriptors associated with the at least one packet based on the header, (2) determine a set of egress queues associated with a corresponding set of egress ports from the plurality of egress ports, and (3) transmit a descriptor from the plurality of descriptors to each egress queue in the set of egress queues. In some embodiments, the apparatus includes selection circuitry configured to select a first egress port from the set of egress ports. In some embodiments, the apparatus includes a crossbar in communication with the ingress port and the plurality of egress ports. In some embodiments, the crossbar is configured to transmit the at least one packet from the ingress port to the first egress port.

In some embodiments, the first egress port is selected based on the first egress port being the first available egress port in the set of egress ports.

In some embodiments, the first egress port is selected based on predefined rules stored in the selection circuitry.

In some embodiments, the set of egress ports includes each of the plurality of egress ports.

In some embodiments, the apparatus includes a buffer configured to store the at least one packet.

In some embodiments, each egress queue is configured to store the descriptor for a first amount of time.

In yet another embodiment, another method is provided. In some embodiments, the method includes receiving at least one packet via an ingress port with the at least one packet comprising data and a header. In some embodiments, the method includes determining a plurality of descriptors associated with the at least one packet based on the header. In some embodiments, the method includes determining a set of egress queues associated with a corresponding set of egress ports from a plurality of egress ports. In some embodiments, the method includes transmitting a descriptor from the plurality of descriptors to each egress queue in the set of egress queues. In some embodiments, the method includes selecting a first egress port from the set of egress ports. In some embodiments, the method includes transmitting a descriptor from a first egress queue associated with the first egress port to the first egress port. In some embodiments, the method includes transmitting the at least one packet through a crossbar such that the at least one packet is routed to the first egress port.

In some embodiments, each egress queue is configured to store the descriptor for a first amount of time.

In some embodiments, the first egress port is selected based on the first egress port being the first available egress port in the set of egress ports.

In some embodiments, the first egress port is selected based on predefined rules.

In some embodiments, the set of egress ports includes each of the plurality of egress ports.

In yet another embodiment, another apparatus is provided. In some embodiments, the apparatus includes an ingress port configured to receive at least one packet with the at least one packet comprising data and a header. In some embodiments, the apparatus includes a buffer configured to receive the at least one packet from the ingress port and store the at least one packet. In some embodiments, the apparatus includes a plurality of egress ports in communication with the ingress port with each egress port configured to discharge the at least one packet. In some embodiments, the apparatus includes a plurality of egress queues in communication with the plurality of egress ports. In some embodiments, each egress queue is associated with one of the plurality of egress ports. In some embodiments, the apparatus includes a control plane in communication with the ingress port and the plurality of egress queues and configured to receive the header from the ingress port. In some embodiments, the control plane is configured to (1) determine a descriptor associated with the at least one packet based on the header, (2) determine a first egress port of the plurality of egress ports from which to discharge the at least one packet, (3) transmit the descriptor to a first egress queue associated with the first egress port, and (4) determine a suitability of the first egress port of the plurality of egress ports for discharging the at least one packet. In some embodiments, the apparatus includes a crossbar in communication with the buffer and the plurality of egress ports and configured to transmit the at least one packet from the buffer to the first egress port. In some embodiments, the apparatus includes requeuing circuitry disposed in the first egress port and configured to transmit the at least one packet to the buffer in an instance in which the control plane determines that the first egress port is not suitable for discharging the at least one packet.

In some embodiments, in a circumstance in which the requeuing circuitry of the first egress port transmits the at least one packet to the buffer, the control plane is further configured to transmit the descriptor to a second egress queue associated with a second egress port. In some embodiments, the crossbar is further configured to transmit the at least one packet from the buffer to the second egress port. In some embodiments, the second egress port is the first available egress port of the plurality of egress ports.

In some embodiments, each egress queue is configured to store the descriptor for a first amount of time.

In yet another embodiment, another method is provided. In some embodiments, the method includes receiving at least one packet via an ingress port, the at least one packet comprising data and a header. In some embodiments, the method includes storing the at least one packet in a buffer. In some embodiments, the method includes determining a first egress port for receiving the at least one packet. In some embodiments, the method includes determining a descriptor associated with the at least one packet based on the header. In some embodiments, the method includes transmitting the descriptor to a first egress queue associated with the first egress port. In some embodiments, the method includes transmitting the descriptor to the first egress port. In some embodiments, the method includes transmitting the at least one packet from the buffer through a crossbar such that the at least one packet is routed to the first egress port. In some embodiments, the method includes determining a suitability of the first egress port for discharging the at least one packet. In some embodiments, the method includes transmitting the at least one packet to the buffer in an instance in which the first egress port is not suitable for discharging the at least one packet.

In some embodiments, in a circumstance in which the at least one packet is transmitted to the buffer, the method further includes transmitting the descriptor to a second egress queue associated with a second egress port. In some embodiments, the method further includes transmitting the at least one packet from the buffer through the crossbar such that the at least one packet is routed to the second egress port. In some embodiments, wherein the second egress port is the first available egress port of a plurality of egress ports.

In some embodiments, each egress queue is configured to store the descriptor for a first amount of time.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
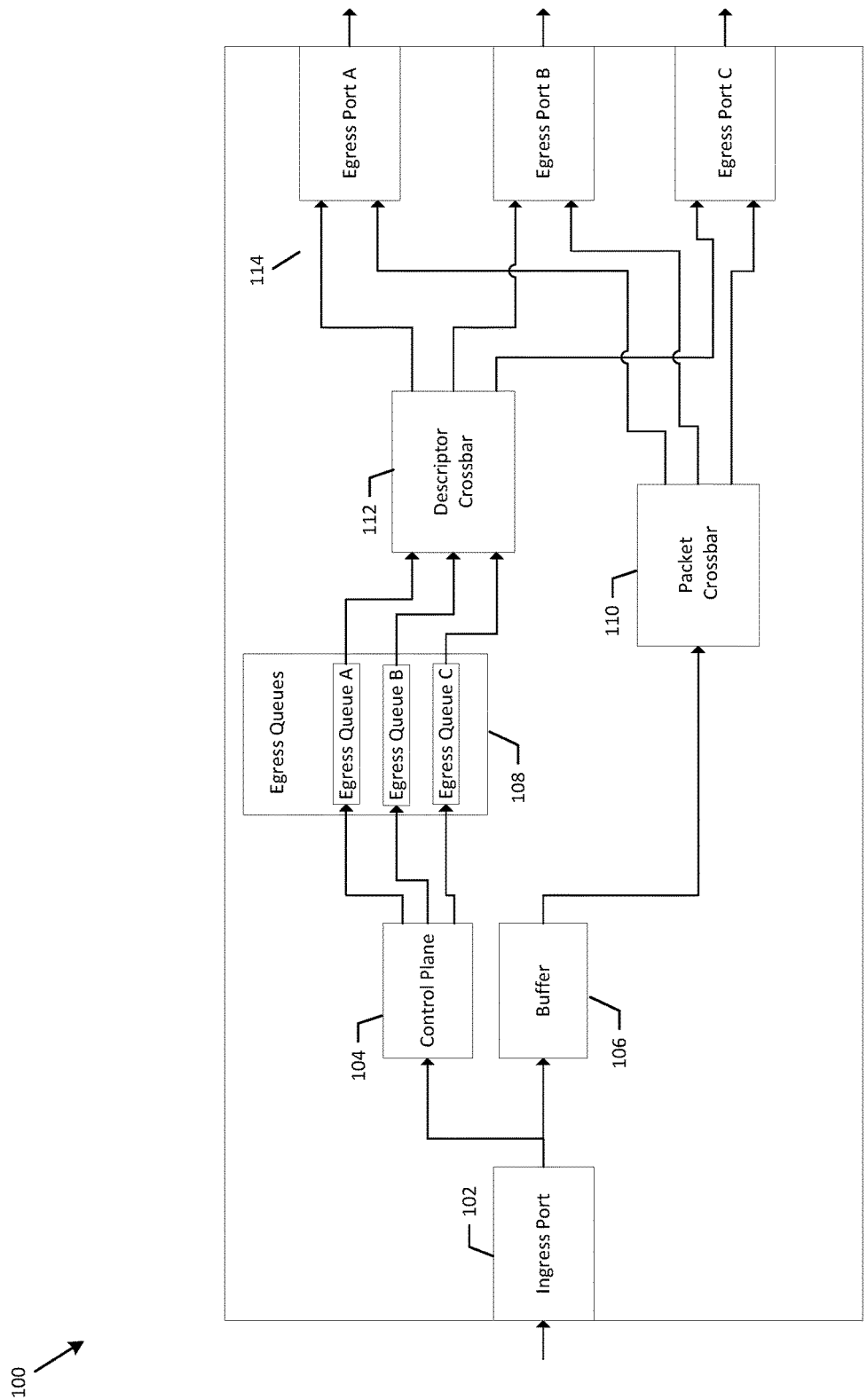
FIG. 1 illustrates an example packet switch including a descriptor crossbar in accordance with one or more embodiments of the present invention.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

In computer networks, packets of data may be sent from one device (a sending device) to another device (a receiving device). The packets of data may include a header, which includes identifying information about the packet (e.g., the Internet Protocol (IP) address of the sending device, the IP address of the receiving device, etc.), and the data being sent (called the payload). The computer networks may include switches that are configured to route the packets from the sending device to the receiving device. In some switches, a packet is received into the switch from the sending device via an ingress port and discharged from the switch via an egress port to the receiving device. A switch may include multiple ingress ports and egress ports. Each or some of the ingress ports and egress ports may be configured to connect to different devices. For example, one egress port may be configured to connect to devices associated with a first IP address, while another egress port may be configured to connect to devices associated with a different IP address. As such, it becomes necessary to route packets within the switch to the appropriate egress port for discharge from the switch and transmission to the receiving device.

In many switches, when a packet is received into the switch, the header of the packet is analyzed to determine which egress port the packet should be discharged from. Additionally, the header of the packet may be analyzed to determine a descriptor that identifies the egress port that the packet should be discharged from. The switch may be configured to handle a large number of packets from multiple unrelated devices, and the rate at which packets are entering the switch may fluctuate. Thus, there may be a delay between when the packet is received into the switch and when the selected egress port is ready to discharge the packet (e.g., if the selected egress port is congested with previous packets that are awaiting discharge). As such, once the descriptor is determined and an egress port is selected, the descriptor may be transmitted to an egress queue associated with the selected egress port, and the packet may be stored in a buffer (e.g., memory) until the egress port is ready to discharge the packet. Once the egress port is ready to discharge the packet, the descriptor is transmitted from the egress queue to the associated egress port that was selected. Then, the packet is transmitted from the buffer by a crossbar (e.g. collection of switches arranged in a matrix configuration) to the egress port with the descriptor and discharged from the switch.

In many switches, once the descriptor is sent to an egress queue there is no way to alter which egress port the packet will be discharged from. However, according to embodiments of the present invention, it is desirable to be able to alter the egress port from which the packet will be discharged after the descriptor has been sent to the egress queue, because circumstances may have changed during the time the packet was waiting to be discharged. For example, in reconfigurable networks the topology of the network may change. As a result, a packet may enter the switch and a descriptor associated with the packet may be transmitted to an egress queue associated with a first egress port that is connected to the device receiving the packet. While the packet is in the switch awaiting transmittal to the device, the network may be reconfigured such that the first egress port is no longer connected to the receiving device. In many conventional switches, this results in the packet either being dropped (e.g., the packet is not transmitted to the receiving device) or in increased congestion on the switch, because the packet must wait on the switch until the network is reconfigured such that the first egress port is again connected to the first egress port. As another example, as the packet is waiting in the switch to be transmitted to the an egress port, the link between the egress port and the receiving device may fail such that the packet can no longer be transmitted to the receiving device via the selected egress port, which may again result in the packet being dropped according to conventional devices and methods. As another example, the large number and variable traffic rate of packets entering the switch as well as the varied destinations of the packets may lead to congestion at one egress port while another egress port may not be congested. In conventional switches, this may similarly delay the packets' discharge from the switch.

Thus, to address the above identified issues of switches used in networks, the inventors have developed switch architectures disclosed herein that enable the switch to discharge a packet via a different egress port after a packet's descriptor has been sent to an egress queue. In one embodiment, the switch includes the addition of a descriptor crossbar between the egress queues and the egress ports that enables the descriptor to be transmitted from an egress queue associated with a first egress port to a second egress port that is not associated with the egress queue. The packet may then be transmitted to the second egress port. According to another embodiment, a switch is described that is configured to generate multiple descriptors and send each descriptor to multiple egress queues, each of which is associated with an egress port. Selection circuitry then selects one of the egress ports associated with the egress queues that have been sent a descriptor, and the packet is sent to that egress port. According to another embodiment, the switch includes requeuing circuitry in each egress port that is configured to reroute packets back to the buffer to be discharged from the switch via a different egress port.

Descriptor Crossbar Switch

With reference to FIG. 1, a switch 100 for performing packet switching on a network is illustrated. The switch 100 may include an ingress port 102 configured to receive packets into the switch 100. As described above, packets may include a header, which includes identifying information about the packet and the data that is being sent (called the payload). Although one such ingress port 102 is displayed in FIG. 1, it would be understood by one skilled in the art in view of this disclosure that the switch may include additional ingress ports 102 (e.g., 1-N ingress ports). The switch 100 may further include a plurality of egress ports 114 in communication with the ingress port 102 and the egress ports may be configured to discharge packets from the switch 100. In some embodiments, one or more of the plurality of egress ports may be configured to be connected to various devices on the network. For example, Egress Port A and Egress Port B, as illustrated, may be connected to a device associated with a first IP address, while Egress Port C may be connected to a device associated with a second IP address. Additionally, the switch 100 may be used in reconfigurable networks in which the devices connected to each of the plurality of egress ports 114 may change. For example, Egress Port A and Egress Port B may initially be connected to the device associated with the first IP address, but after the network is reconfigured Egress Port B may be connected to a device associated with a third IP address. Although three such egress ports 114 are displayed in FIG. 1, it would be understood by one skilled in the art in view of this disclosure that the switch 100 may include additional or fewer egress ports 114 (e.g., 1-N egress ports). The switch 100 may further include a plurality of egress queues 108 with each egress queue associated with a corresponding egress port. For example, Egress Queue A may be associated with Egress Port A, and so on. Although not depicted as such in FIG. 1, in some embodiments, there may be more than one egress queue associated with an egress port. For example, in some embodiments, there may be two or more egress queues associated with a single egress port.

The switch 100 may include a control plane 104 in communication with the ingress port 102 and the plurality of egress queues 108. The control plane 104 may be configured to receive packet headers from the ingress port 102. In some embodiments, the control plane 104 may be configured to determine a descriptor for a packet from the information in a packet's header. In some embodiments, the descriptor associated with a packet may be configured to identify the egress port of the plurality of egress ports 114 from which a packet should be discharged. In some embodiments, for example, the control plane 104 may be configured to determine a first egress port of the plurality of egress ports 114 from which a packet should be discharged. For example, this may be based on which egress port is connected to the device receiving the packet, the congestion of each egress port, and/or congestion elsewhere in the packets path to the device receiving the packet if the packet is discharged via the first egress port (e.g. after being discharged from the first egress port the packet may go through other network nodes, such as another switch, that may be congested). The control plane 104 may then be configured to transmit the descriptor associated with the packet to the egress queue associated with the first egress port. For example, with reference to the embodiment depicted in FIG. 1, if the control plane 104 determines that a packet should be discharged from Egress Port B, the control plane 104 would transmit the descriptor to Egress Queue B. In some embodiments, each of the plurality of egress queues 108 may be configured to store a descriptor associated with a packet until the switch 100 is ready to discharge the packet from the switch 100 via an egress port.

In some embodiments, the switch 100 may further include a buffer 106 (e.g., memory) in communication with the ingress port 102. The buffer 106 may be configured to receive a packet from the ingress port 102 and store the packet until the packet is discharged from the switch 100 via one of the plurality of egress ports 114. Although the discussion herein refers to the packet being discharged from one egress port of the plurality of egress ports 114, it will be understood by one skilled in the art in view of this disclosure that, in some embodiments, the packet may be discharged from multiple egress ports. For example, it may be advantageous to discharge the packet via multiple egress ports for multicasting and/or broadcasting implementations. In embodiments with more than one ingress port 102, the switch 100 may include one buffer 106 in communication with all of the ingress ports and configured to store packets received via any of the ingress ports until the packets are discharged from the switch 100. Alternatively, in embodiments with more than one ingress port 102, each ingress port 102 may have a dedicated buffer 106. As another alternative in embodiments with more than one ingress port 102, there may be multiple buffers with each buffer 106 storing packets from a portion of the ingress ports. In some embodiments, the buffer 106 may be disposed within the ingress port 102. In other words, in such embodiments, the buffer 106 may be a component of or reside in the ingress port 102.

In some embodiments, the switch 100 may include a descriptor crossbar 112 in communication with the plurality of egress queues 108 and the plurality of egress ports 114. The descriptor crossbar 112 may be configured to transmit a descriptor from an egress queue to an egress port. In this regard, the descriptor crossbar 112 may be configured to transmit a descriptor to an egress port from an egress queue that is associated with a different egress port. For example, if a descriptor is stored in Egress Queue A, the descriptor crossbar 112 may be configured to transmit the descriptor from Egress Queue A to Egress Port B. In some embodiments, the decision to transmit the descriptor to an egress port from an egress queue that is associated with a different egress port may be made by the control plane 104. In some embodiments, the descriptor crossbar 112 may be configured to operate at a capacity that is less than line rate. In many switches, if a port (e.g., egress port or ingress port) is operating at a certain line rate (e.g., a capacity of 200 Gbps), the packets in the switch must be forwarded at the same speed as the egress port's line rate. However, because the descriptor may only be a pointer (e.g., a few bytes of data) and only used for identifying the egress port from which a packet should be discharged, it is not necessary for the descriptor crossbar 112 to operate at line rate. Accordingly, the power consumption and cost of the switch 100 may be reduced as higher speeds increase power consumption and costs (e.g., costs are increased because obtaining higher speeds can require the switch to include more components and/or higher performing components).

In some embodiments, the switch 100 may include a packet crossbar 110 in communication with the buffer 106 and/or the ingress port 102 and also in communication with the plurality of egress ports 114. In some embodiments, the packet crossbar 110 may be configured to transmit packets from the buffer 106 (or the ingress port 102 in embodiments where the buffer 106 is a component of the ingress port 102) to the plurality of egress ports 114. In some embodiments, the packet crossbar 110 may transmit a packet to the egress port to which the descriptor associated with the packet has been transmitted. For example, if the descriptor associated with the packet has been transmitted to Egress Port B by the descriptor crossbar 112, the packet crossbar 110 may transmit the packet to Egress Port B. Thus, the switch 100 is capable of changing the egress port from which the packet is discharged after the descriptor has been sent to the plurality of egress queues 108. Said differentially, a packet may enter the switch 100, the control plane 104 may determine to discharge the packet via a first egress port (e.g., Egress Port A) and transmit a descriptor to the egress queue associated with the first egress port (e.g., Egress Queue A). If the switch 100 decides to discharge the packet via a second egress port (e.g., Egress Port B) while the descriptor is in the egress queue associated with the first egress port, the switch 100 may transmit the descriptor from the egress queue associated with the first egress port to the second egress port via the descriptor crossbar 112. Then, the packet may be transmitted by the packet crossbar 110 to the second egress port (e.g., Egress Port B), to be discharged via the second egress port.

Example Method

Figure 2:
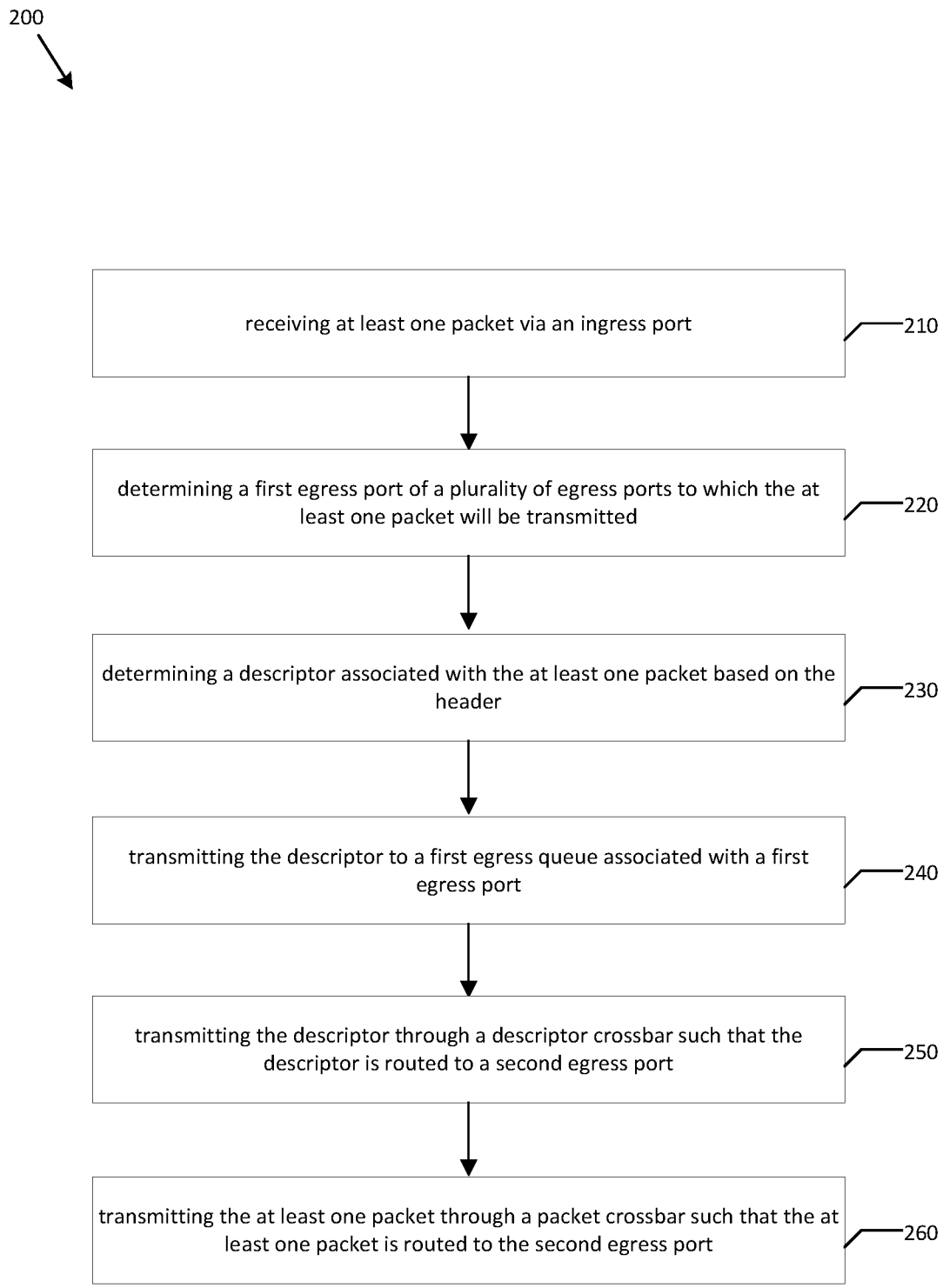
FIG. 2 illustrates an example process of packet switching using a descriptor crossbar in accordance with one or more embodiments of the present invention.

With reference to FIG. 2, a flowchart is illustrated according to an example process 200 for performing packet switching. As shown at block 210, the process 200 comprises receiving at least one packet via an ingress port. The packet may include data and a header. As shown at block 220, the process 200 continues with determining a first egress port of a plurality of egress ports to which the at least one packet will be transmitted. As shown at block 230, the process 200 continues with determining a descriptor associated with the at least one packet based on the header. As shown at block 240, the process 200 transmits the descriptor to a first egress queue associated with the first egress port. As shown at block 250, the process 200 transmits the descriptor through a descriptor crossbar such that the descriptor is routed to a second egress port. As shown at block 260, the process 200 transmits the at least one packet through a packet crossbar such that the at least one packet is routed to the second egress port.

Selection Circuitry Switch

Figure 3:
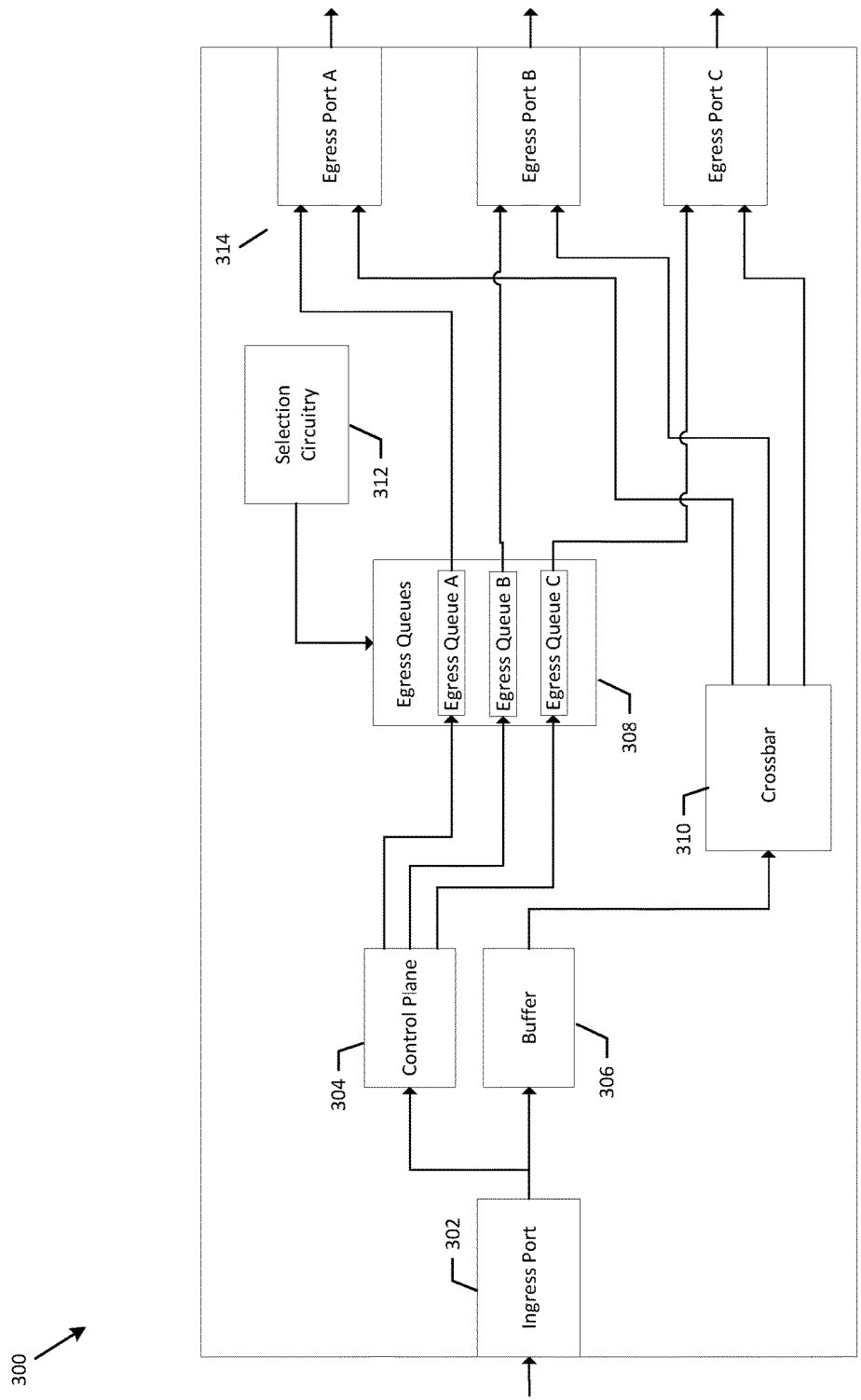
FIG. 3 illustrates an example packet switch including selection circuitry in accordance with one or more embodiments of the present invention.

With reference to FIG. 3, a switch 300 for performing packet switching on a network is illustrated. The switch 300 may include an ingress port 302 configured to receive packets into the switch 300. As described above packets may include a header, which includes identifying information about the packet and the data (payload) that is being sent. Although one such ingress port 302 is displayed in FIG. 3, it would be understood by one skilled in the art in view of this disclosure that the switch may include additional ingress ports 302 (e.g., 1-N ingress ports). The switch 300 may further include a plurality of egress ports 314 in communication with the ingress port 302 and the egress ports may be configured to discharge packets from the switch 300. In some embodiments, one or more of the plurality of egress ports may be configured to be connected to various devices on the network. For example, Egress Port A and Egress Port B, as illustrated, may be connected to a device associated with a first IP address, while Egress Port C may be connected to a device associated with a second IP address. Additionally, the switch 300 may be used in reconfigurable networks in which the devices connected to each of the plurality of egress ports 314 may change. For example, Egress Port A and Egress Port B may initially be connected to the device associated with the first IP address, but after the network is reconfigured Egress Port B may be connected to a device associated with a third IP address. Although three such egress ports 314 are displayed in FIG. 3, it would be understood by one skilled in the art in view of this disclosure that the switch 300 may include additional or fewer egress ports 314 (e.g., 1-N egress ports). The switch 300 may further include a plurality of egress queues 308 with each egress queue associated with a corresponding egress port. For example, Egress Queue A may be associated with Egress Port A, and so on. Although not depicted as such in FIG. 3, in some embodiments, there may be more than one egress queue associated with an egress port. For example, in some embodiments, there may be two or more egress queues associated with a single egress port.

The switch 300 may include a control plane 304 in communication with the ingress port 302 and the plurality of egress queues 308. The control plane 304 may be configured to receive packet headers from the ingress port 302. In some embodiments, the control plane 304 may be configured to determine a plurality of descriptors for a packet from the information in a packet's header. In some embodiments, each of the plurality of descriptors may be identical. In some embodiments, each of the descriptors may be configured to identify the egress port of the plurality of egress ports 314 from which the packet should be discharged. In some embodiments, the control plane 304 may be configured to determine a set of egress queues associated with a corresponding set of egress ports from the plurality of egress ports 314. The set of egress ports, for example, may include all of the egress ports that are connected to the device that is receiving the packet. Additionally or alternatively, the set of egress ports may include all of the egress ports that are below a certain level of congestion. In some embodiments, the set of egress ports may include each of the plurality of egress ports 314 (e.g., all of the egress ports on the switch). In some embodiments, the control plane 304 may be configured to transmit a descriptor from the plurality of descriptors to each egress queue in the set of egress queues.

In some embodiments, the switch 300 may include selection circuitry 312. The selection circuitry 312 may be configured to select a first egress port from the set of egress ports from which to discharge the packet. In some embodiments, the selection circuitry 312 may select the first egress port based on predefined rules stored in the selection circuitry. For example, the selection circuitry 312 may select the first egress port because the first egress port may be connected to the device that is receiving the packet. As another example, the selection circuitry 312 may select the first egress port because it is available to transmit the packet when other egress ports are not available. As another example, the selection circuitry 312 may select the first egress port because it is functioning normally (e.g., the first egress port is not broken). In some embodiments, after a descriptor has been transmitted to the first egress port, the selection circuitry 312 may be configured to delete the descriptors associated with the packet that are stored in the egress queues associated with egress ports that were not selected. As such, the selection circuitry 312 enables the switch 300 to alter the egress port from which the packet is discharged after a descriptor has been sent to an egress queue.

In some embodiments, the switch 300 may further include a buffer 306 (e.g., memory) in communication with the ingress port 302. The buffer 306 may be configured to receive a packet from the ingress port 302 and store the packet until the packet is discharged from the switch 300 via one of the plurality of egress ports 314. Although the discussion herein refers to the packet being discharged from one egress port of the plurality of egress ports 314, it will be understood by one skilled in the art in view of this disclosure that, in some embodiments, the packet may be discharged from multiple egress ports. For example, it may be advantageous to discharge the packet via multiple egress ports for multicasting and/or broadcasting implementations. In embodiments with more than one ingress port 302, the switch 300 may include one buffer 306 in communication with all of the ingress ports and configured to store packets received via any of the ingress ports until the packets are discharged from the switch 300. Alternatively, in embodiments with more than one ingress port 302, each ingress port 302 may have a dedicated buffer 306. As another alternative in embodiments with more than one ingress port 302, there may be multiple buffers with each buffer 306 storing packets from a portion of the ingress ports. In some embodiments, the buffer 306 may be disposed within the ingress port 302. In other words, in such embodiments, the buffer 306 may be a component of or may reside in the ingress port 302.

In some embodiments, the switch 300 may include a crossbar 310 in communication with the buffer 306 and/or the ingress port 302 and also in communication with the plurality of egress ports 314. In some embodiments, the crossbar 310 may be configured to transmit packets from the buffer 306 (or from the ingress port 302 in embodiments where the buffer 306 is a component of the ingress port 302) to the plurality of egress ports 314. In some embodiments, the crossbar 310 may transmit a packet to the egress port to which the descriptor associated with the packet has been transmitted. For example, if the descriptor associated with the packet has been transmitted to Egress Port B by the descriptor crossbar 112, the crossbar 310 may transmit the packet to Egress Port B, as well.

Example Method

Figure 4:
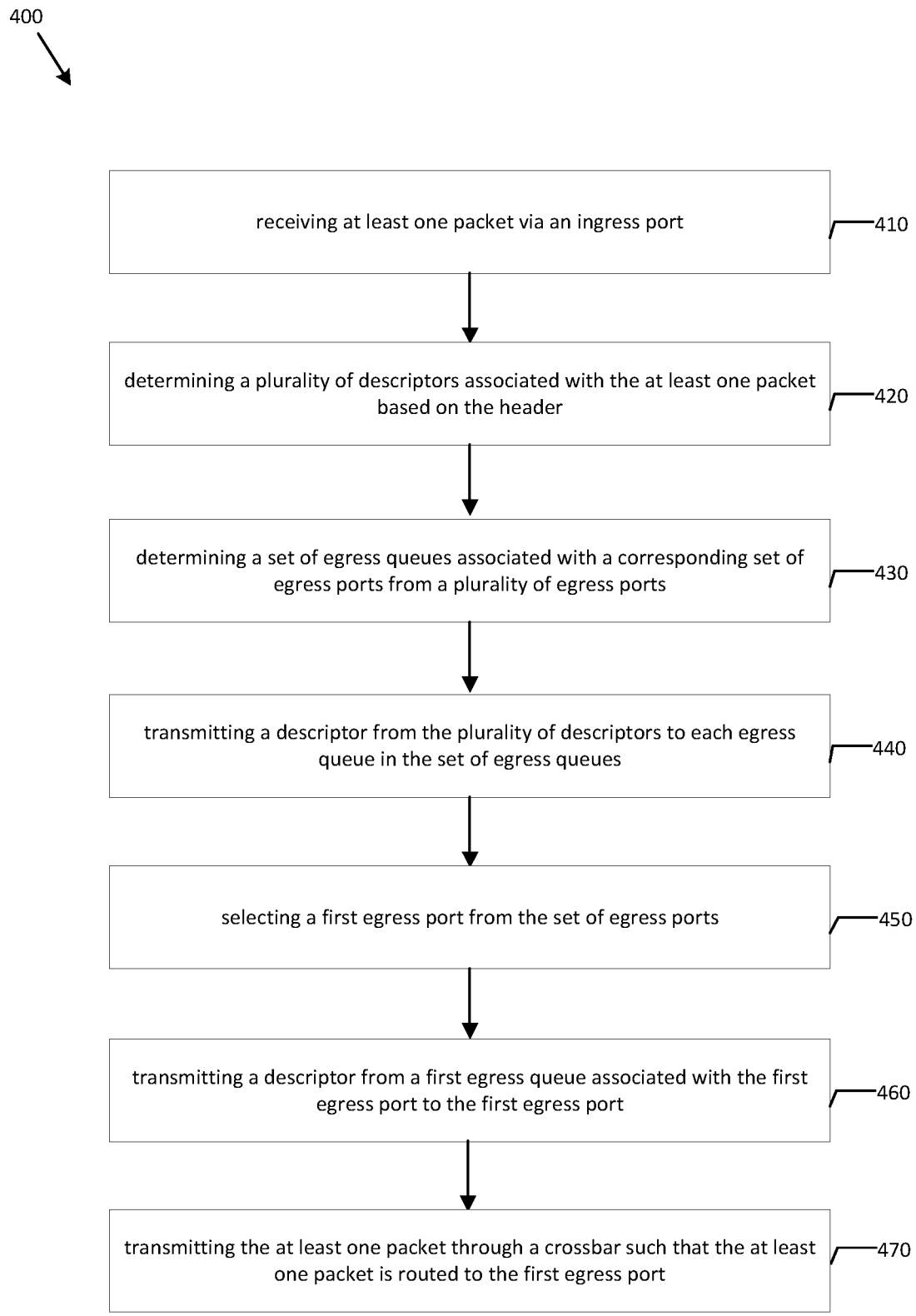
FIG. 4 illustrates an example process of packet switching using egress port selection in accordance with one or more embodiments of the present invention.

With reference to FIG. 4, a flowchart is illustrated according to an example process 400 for performing packet switching as described above in connection with the embodiment shown in FIG. 3. As shown in block 410, the process 400 may receive at least one packet via an ingress port. The packet may include data and a header. As shown in block 420, the process 400 may include determining a plurality of descriptors associated with the at least one packet based on the header As shown in block 430, the process 400 may determine a set of egress queues associated with a corresponding set of egress ports from a plurality of egress ports. As shown in block 440, a descriptor from the plurality of descriptors may be transmitted to each egress queue in the set of egress queues. As shown in block 450, a first egress port may be selected from the set of egress ports. As shown in block 460, the process 400 may include transmitting a descriptor from a first egress queue associated with the first egress port to the first egress port. As shown in block 470, the process 400 may include transmitting the at least one packet through a crossbar such that the at least one packet is routed to the first egress port.

Requeuing Circuity Switch

Figure 5:
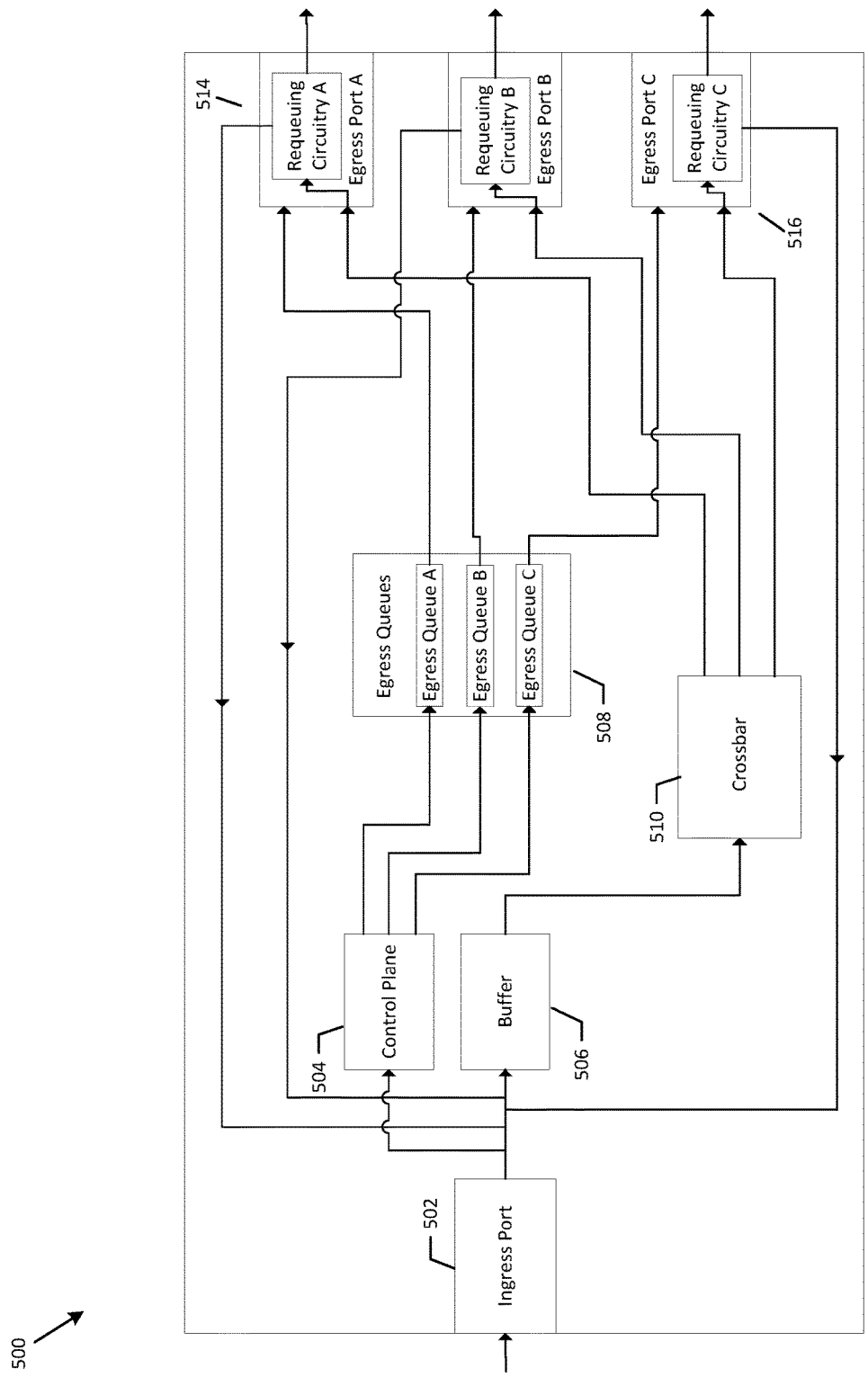
FIG. 5 illustrates an example packet switch including requeuing circuitry in accordance with one or more embodiments of the present invention.

With reference to FIG. 5, a switch 500 for performing packet switching on a network according to another embodiment is illustrated. The switch 500 may include an ingress port 502 configured to receive packets into the switch 500. As described above, the packets may include a header, which includes identifying information about the packet and the data (payload) that is being sent. Although one such ingress port 502 is displayed in FIG. 5, it would be understood by one skilled in the art in view of this disclosure that the switch may include additional ingress ports 502 (e.g., 1-N ingress ports). The switch 500 may further include a plurality of egress ports 514 in communication with the ingress port 502, and the egress ports may be configured to discharge packets from the switch 500. In some embodiments, one or more of the plurality of egress ports may be configured to be connected to various devices on the network. For example, Egress Port A and Egress Port B may be connected to a device associated with a first IP address, while Egress Port C may be connected to a device associated with a second IP address. Additionally, the switch 500 may be used in reconfigurable networks in which the devices connected to the each of the plurality of egress ports 514 may change. For example, Egress Port A and Egress Port B may initially be connected to the device associated with the first IP address, but after the network is reconfigured Egress Port B may be connected to a device associated with a third IP address. Although three such egress ports 514 are displayed in FIG. 5, it would be understood by one skilled in the art in view of this disclosure that the switch 500 may include additional or fewer egress ports 514 (e.g., 1-N egress ports). The switch 500 may further include a plurality of egress queues 508 with each egress queue associated with a corresponding egress port. For example, Egress Queue A may be associated with Egress Port A, and so on. Although not depicted as such in FIG. 5, in some embodiments, there may be more than one egress queue associated with an egress port. For example, in some embodiments, there may be two or more egress queues associated with a single egress port.

The switch 500 may include a control plane 504 in communication with the ingress port 502 and the plurality of egress queues 508. The control plane 504 may be configured to receive packet headers from the ingress port 502. In some embodiments, the control plane 504 may be configured to determine a descriptor for a packet from the information in the packet's header. In some embodiments, the descriptor may be configured to identify the egress port of the plurality of egress ports 514 from which a packet should be discharged. In some embodiments, the control plane 504 may be configured to determine a first egress port of the plurality of egress ports 514 from which the packet should be discharged. For example, this may be based on which egress port is connected to the device receiving the packet or the congestion of each egress port. The control plane 504 may then be configured to transmit the descriptor associated with a packet to the egress queue associated with the first egress port. For example, in the depicted embodiment, if the control plane 504 determines that a packet should be discharged from Egress Port B, the control plane 504 would transmit the descriptor to Egress Queue B. In some embodiments, each of the plurality of egress queues 508 may be configured to store a descriptor associated with the packet until the switch 500 is ready to discharge the packet from the switch 500 via an egress port. In some embodiments, the control plane 504 may be configured to determine the suitability of the first egress port of the plurality of egress ports for discharging the packet. In some embodiments, the control plane 504 may determine the suitability of the first egress port after the control plane 504 has transmitted the descriptor to the plurality of egress queues 508. The suitability may be based on a number of factors, such as the congestion of the first egress port, congestion elsewhere in the packets path to the device receiving the packet if the packet is discharged via the first egress port (e.g. after being discharged from the first egress port the packet may go through other network nodes, such as another switch, that may be congested), whether the link between the first egress port and device receiving the packet has suffered a failure, and/or whether the network has been reconfigured such that the first egress port is no longer connected to the device receiving the packet.

In some embodiments, the switch 500 may further include a buffer 506 (e.g., memory) in communication with the ingress port 502. The buffer 506 may be configured to receive a packet from the ingress port 502 and store the packet until the packet is discharged from the switch 500 via one of the plurality of egress ports 514. Although the discussion herein refers to the packet being discharged from one egress port of the plurality of egress ports 514, it will be understood by one skilled in the art in view of this disclosure that, in some embodiments, the packet may be discharged from multiple egress ports. For example, it may be advantageous to discharge the packet via multiple egress ports for multicasting and/or broadcasting implementations. In embodiments with more than one ingress port 502, the switch 500 may include one buffer 506 in communication with all of the ingress ports and configured to store packets received via any of the ingress ports until the packets are discharged from the switch 500. Alternatively, in embodiments with more than one ingress port 502, each ingress port 502 may have a dedicated buffer 506. As another alternative in embodiments with more than one ingress port 502, there may be multiple buffers with each buffer 506 storing packets from a portion of the ingress ports. In some embodiments, the buffer 506 may be disposed within the ingress port 502. In other words, in such embodiments, the buffer 506 may be a component of or reside in the ingress port 502.

In some embodiments, the switch 500 may include a crossbar 510 in communication with the buffer 506 and/or the ingress port 502 and also in communication with the plurality of egress ports 514. In some embodiments, the crossbar 510 may be configured to transmit packets from the buffer 506 (or the ingress port 502 in embodiments where the buffer 506 is a component of the ingress port 502) to the plurality of egress ports 514. In some embodiments, the crossbar 510 may transmit a packet to the egress port that the descriptor associated with the packet has been transmitted to. For example, if the descriptor associated with the packet has been transmitted to Egress Port B, the crossbar 510 may transmit the packet to Egress Port B.

In some embodiments, the switch 500 may include requeuing circuitry 516 in communication with the buffer 506. In some embodiments, the requeuing circuitry 516 may be disposed within each of the plurality of egress ports 514. In some embodiments, the switch 500 may only include one requeuing circuitry that may be shared by each of the plurality of egress ports 514. For example, in such an embodiment, the one requeuing circuitry may be disposed between the crossbar 510 and the plurality of egress ports 514 and may be in communication with each of the plurality of egress ports 514, the crossbar 510, and the buffer 506. In some embodiments, the requeuing circuitry may be configured to transmit packets received into the plurality of egress ports 514 to the buffer 506 if the control plane 504 determines that the egress port is not suitable for discharging a packet. In this regard, while the packet is in the buffer 506 and the descriptor is in one of the plurality of egress queues (e.g., the first egress port 508), the control plane 504 may determine that the first egress port is no longer suitable for discharging the packet. For example, the control plane 504 may determine that the first egress port is congested and a second egress port is available to discharge the packet. As another example, the control plane 504 may determine that the first egress port is no longer in communication with the device receiving the packet. As another example, the control plane 504 may determine that the link between the first egress port and the device receiving the packet has failed. If the control plane 504 determines that the first egress port is no longer suitable for discharging the packet, the control plane 504 may then instruct the requeuing circuitry 516 disposed in the first egress port to requeue the packet back to the buffer 506. In some embodiments, if the requeuing circuitry 516 receives such an instruction from the control plane 504, the requeuing circuitry 516 in the first egress port may transmit the packet back to the buffer 506 when the packet arrives in the egress port. In some embodiments, the requeuing circuitry 516 may be configured to identify the packets that should be requeued though analysis of packet headers. For example, the control plane 504 may instruct the requeuing circuitry 516 that all packets associated with a first IP address should be requeued. In some embodiments, if the control plane 504 has not instructed the requeuing circuitry of the first egress port to transmit a packet back to the buffer 506, the packet will be discharged from the switch 500 via the first egress port.

In some embodiments, once a packet has been transmitted back to the buffer 506, the control plane 504 may be configured to transmit a descriptor associated with the packet to a second egress queue associated with a second egress port. Then, once the second egress port is ready to discharge the packet, the descriptor and the packet may be transmitted to the second egress port to be discharged from the switch 500. In some embodiments, a packet can be requeued multiple times until a suitable egress port is identified.

Example Method

Figure 6:
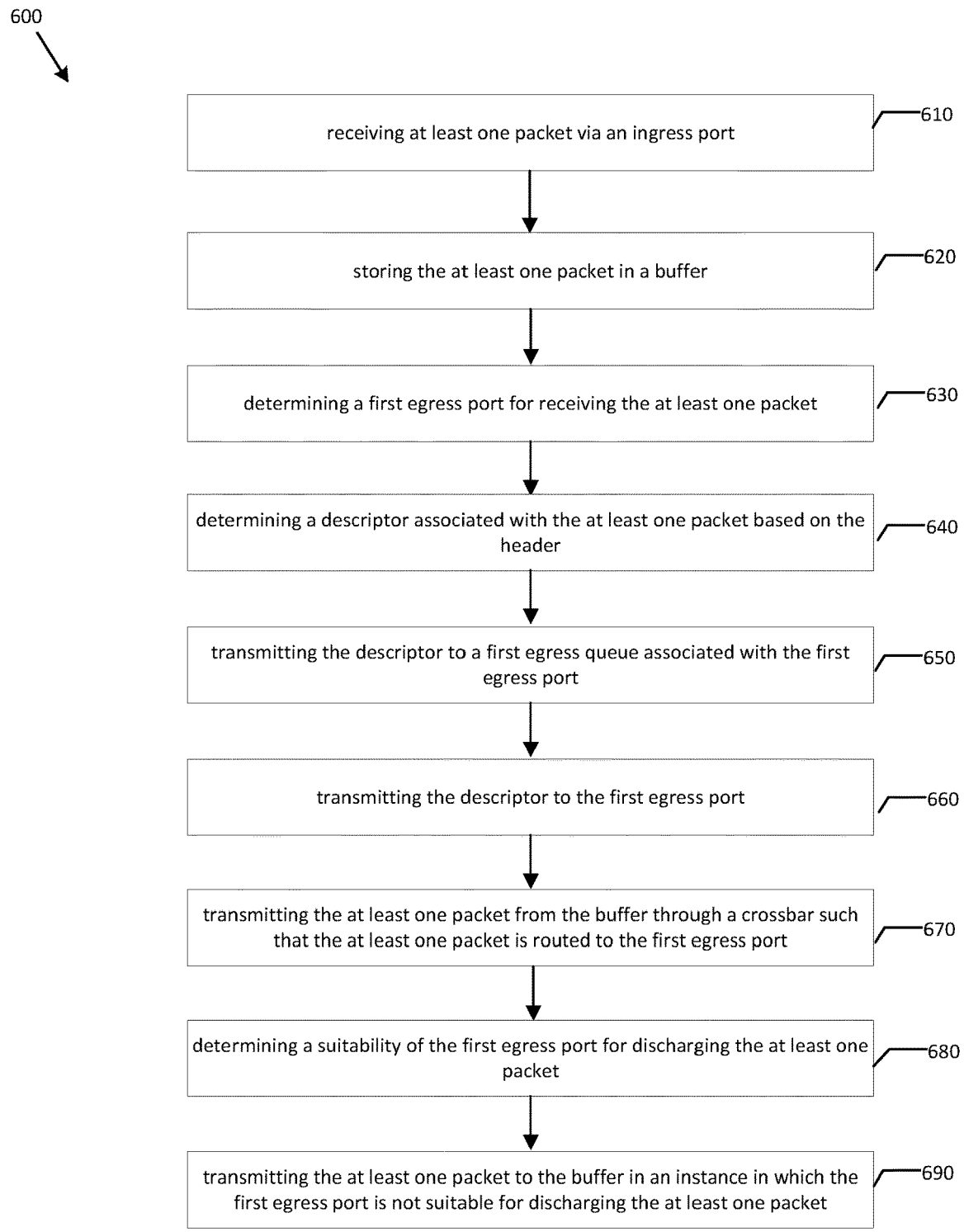
FIG. 6 illustrates an example process of packet switching with requeuing in accordance with one or more embodiments of the present invention.

With reference to FIG. 6, a flowchart is illustrated according to an example process 600 for performing packet switching. As shown at block 610, the process 600 comprises receiving at least one packet via an ingress port. The packet may include data and a header. As shown at block 620, the process 600 includes storing the at least one packet in a buffer. As shown at block 630, a first egress port is determined for receiving the at least one packet. As shown at block 640, the process 600 includes determining a descriptor associated with the at least one packet based on the header. As shown at block 650, the descriptor is transmitted to a first egress queue associated with a first egress port. As shown at block 660, the process 600 comprises transmitting the descriptor to the first egress port. As shown at block 670, the at least one packet is transmitted from the buffer through a crossbar such that the at least one packet is routed to the first egress port. As shown at block 680, the process 600 comprises determining a suitability of the first egress port for discharging the at least one packet. As shown at block 690, the process 600 comprises transmitting the at least one packet to the buffer if the first egress port is not suitable for discharging the at least one packet.

Figure 7:
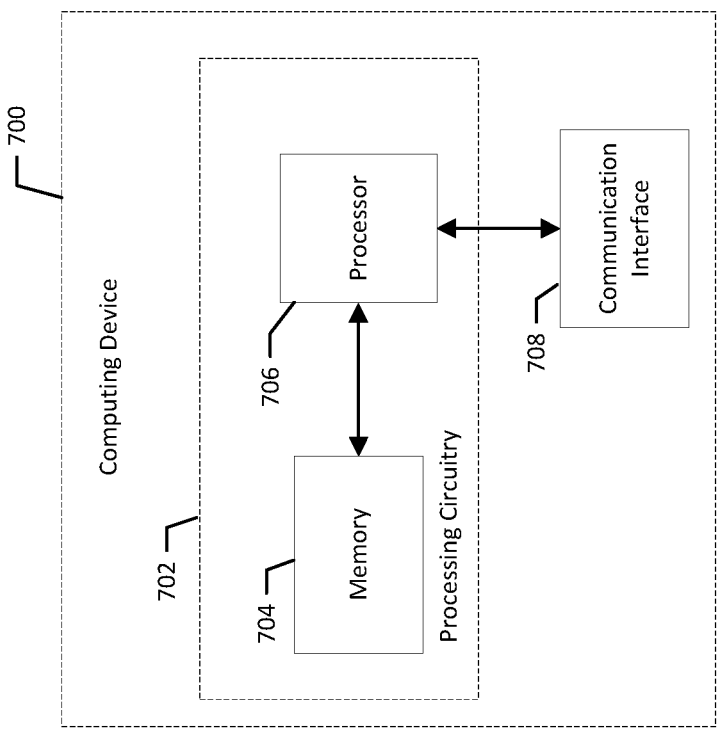
FIG. 7 illustrates an example computing device in accordance with one or more embodiments of the present invention.

Referring now to FIG. 7, a block diagram of a computing device 700 is illustrated. In some embodiments, the control plane 104, control plane 304, selection circuitry 312, control plane 504, and the requeuing circuitry 516 may be embodied as one or more computing devices such as the one shown in FIG. 7. The computing device 700 may include or otherwise be in communication with processing circuitry 702 that is configurable to perform actions in accordance with one or more embodiments disclosed herein. In this regard, the processing circuitry 702 may be configured to perform and/or control performance of one or more functionalities of the computing device 700 in accordance with various embodiments, and thus may provide means for performing functionalities of the computing device 700 in accordance with various embodiments. The processing circuitry 702 may be configured to perform data processing, application execution and/or other processing and management services according to one or more embodiments. In some embodiments, the computing device 700 or a portion(s) or component(s) thereof, such as the processing circuitry 702, may be embodied as or comprise a chip or chip set. In other words, the computing device 700 or the processing circuitry 702 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computing device 700 or the processing circuitry 702 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 702 may include a processor 706 and, in some embodiments, such as that illustrated in FIG. 7, may further include memory 704. The processing circuitry 702 may be in communication with or otherwise control a communication interface 708. As such, the processing circuitry 702 may be embodied as a circuit chip (e.g., an integrated circuit chip) configured (e.g., with hardware, software or a combination of hardware and software) to perform operations described herein.

The processor 706 may be embodied in a number of different ways. For example, the processor 706 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 706 may comprise a plurality of processors. The plurality of processors may be in operative communication with each other and may be collectively configured to perform one or more functionalities of the computing device 700 as described herein. In some embodiments, the processor 706 may be configured to execute instructions stored in the memory 704 or otherwise accessible to the processor 706. As such, whether configured by hardware or by a combination of hardware and software, the processor 706 may represent an entity (e.g., physically embodied in circuitry—in the form of processing circuitry 702) capable of performing operations according to embodiments of the present disclosure while configured accordingly. Thus, for example, when the processor 706 is embodied as an ASIC, FPGA or the like, the processor 706 may be specifically configured hardware for conducting the operations described herein. Alternatively, as another example, when the processor 706 is embodied as an executor of software instructions, the instructions may specifically configure the processor 706 to perform one or more operations described herein.

In some embodiments, the memory 704 may include one or more non-transitory memory devices such as, for example, volatile and/or non-volatile memory that may be either fixed or removable. In this regard, the memory 704 may comprise a non-transitory computer-readable storage medium. It will be appreciated that while the memory 704 is illustrated as a single memory, the memory 704 may comprise a plurality of memories. The memory 704 may be configured to store information, data, applications, instructions and/or the like for enabling the computing device 700 to carry out various functions in accordance with one or more embodiments. For example, the memory 704 may be configured to buffer input data for processing by the processor 706. Additionally or alternatively, the memory 704 may be configured to store instructions for execution by the processor 706. As yet another alternative, the memory 704 may include one or more databases that may store a variety of files, contents or data sets. Among the contents of the memory 704, applications may be stored for execution by the processor 706 in order to carry out the functionality associated with each respective application. In some cases, the memory 704 may be in communication with one or more of the processor 706 and/or communication interface 708 via a bus(es) for passing information among components of the computing device 700.

The communication interface 708 may include one or more interface mechanisms for enabling communication with other devices and/or networks. In some cases, the communication interface 708 may be any means such as a device or circuitry embodied in either hardware, or a combination of hardware and software that is configured to receive and/or transmit data from/to a network and/or any other device or module in communication with the processing circuitry 702. By way of example, the communication interface 708 may be configured to enable the computing device 700 to communicate with other components of the switch 100, the switch 300 and the switch 500. Accordingly, the communication interface 708 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   an ingress port configured to receive at least one packet, the at least one packet comprising data and a header;

a plurality of egress ports in communication with the ingress port, each egress port configured to discharge the at least one packet;
a plurality of egress queues, wherein each egress queue is associated with one of the plurality of egress ports;
a control plane in communication with the ingress port and the plurality of egress queues and configured to receive the header from the ingress port, wherein the control plane is configured to (1) determine a descriptor associated with the at least one packet based on the header, (2) determine a first egress port of the plurality of egress ports from which to discharge the at least one packet, and (3) transmit the descriptor to an egress queue associated with the first egress port;
a descriptor crossbar in communication with the egress queue and the plurality of egress ports configured to transmit the descriptor from the egress queue to a second egress port of the plurality of egress ports; and
a packet crossbar in communication with the ingress port and the plurality of egress ports, wherein the packet crossbar is configured to transmit the at least one packet from the ingress port to the second egress port.

2. The apparatus of claim 1 further comprising a buffer configured to store the at least one packet.

3. The apparatus of claim 1, wherein each egress queue is configured to store the descriptor for a first amount of time.

4. The apparatus of claim 1, wherein the second egress port is the first available egress port of the plurality of egress ports.

5. The apparatus of claim 1, wherein the descriptor crossbar operates at a capacity that is less than line rate.

6. A method comprising:
receiving at least one packet via an ingress port, the at least one packet comprising data and a header;
determining a first egress port of a plurality of egress ports to which the at least one packet will be transmitted;
determining a descriptor associated with the at least one packet based on the header;
transmitting the descriptor to a first egress queue associated with a first egress port;
transmitting the descriptor through a descriptor crossbar such that the descriptor is routed to a second egress port; and
transmitting the at least one packet through a packet crossbar such that the at least one packet is routed to the second egress port.

7. The method of claim 6, wherein the descriptor crossbar operates at a capacity that is less than line rate.

8. The method of claim 6, wherein each egress queue is configured to store the descriptor for a first amount of time.

9. The method of claim 6, wherein the second egress port is the first available egress port of the plurality of egress ports.

10. An apparatus comprising:
an ingress port configured to receive at least one packet, the at least one packet comprising data and a header;
a plurality of egress ports in communication with the ingress port, each egress port configured to discharge the at least one packet;
a plurality of egress queues in communication with the plurality of egress ports, wherein each egress queue is associated with one of the plurality of egress ports;
a control plane in communication with the ingress port and the plurality of egress queues, and configured to receive the header from the ingress port, wherein the control plane is configured to (1) determine a plurality of descriptors associated with the at least one packet based on the header, (2) determine a set of egress queues associated with a corresponding set of egress ports from the plurality of egress ports, and (3) transmit a descriptor from the plurality of descriptors to each egress queue in the set of egress queues;
selection circuitry configured to select a first egress port from the set of egress ports; and
a crossbar in communication with the ingress port and the plurality of egress ports, wherein the crossbar is configured to transmit the at least one packet from the ingress port to the first egress port.

11. The apparatus of claim 10, wherein the first egress port is selected based on the first egress port being the first available egress port in the set of egress ports.

12. The apparatus of claim 10, wherein the first egress port is selected based on predefined rules stored in the selection circuitry.

13. The apparatus of claim 10, wherein the set of egress ports includes each of the plurality of egress ports.

14. The apparatus of claim 10, further comprising a buffer configured to store the at least one packet.

15. The apparatus of claim 10, wherein each egress queue is configured to store the descriptor for a first amount of time.

16. A method comprising:
receiving, via an ingress port, at least one packet, the at least one packet comprising data and a header;
determining, via a control plane in communication with the ingress port and a plurality of egress queues a plurality of descriptors associated with the at least one packet based on the header received by the control plane from the ingress port;
determining, via the control plane, a set of egress queues associated with a corresponding set of egress ports from the plurality of egress ports, wherein each egress port is configured to discharge the at least one packet and is in communication with the ingress port;
transmitting, via the control plane, a descriptor from the plurality of descriptors to each egress queue in the set of egress queues;
selecting, via selection circuitry, a first egress port from the set of egress ports; and
transmitting, through a crossbar in communication with the ingress port and the plurality of egress ports, the at least one packet such that the at least one packet is routed to the first egress port.

17. The method of claim 16, wherein each egress queue is configured to store the descriptor for a first amount of time.

18. The method of claim 16, wherein the first egress port is selected based on the first egress port being the first available egress port in the set of egress ports.

19. The method of claim 16, wherein the first egress port is selected based on predefined rules.

20. The method of claim 16, wherein the set of egress ports includes each of the plurality of egress ports.

21. An apparatus comprising:
an ingress port configured to receive at least one packet, the at least one packet comprising data and a header;
a buffer configured to receive the at least one packet from the ingress port and store the at least one packet;
a plurality of egress ports in communication with the ingress port, each egress port configured to discharge the at least one packet;
a plurality of egress queues in communication with the plurality of egress ports, wherein each egress queue is associated with one of the plurality of egress ports;

a control plane in communication with the ingress port and the plurality of egress queues and configured to receive the header from the ingress port, wherein the control plane is configured to (1) determine a descriptor associated with the at least one packet based on the header, (2) determine a first egress port of the plurality of egress ports from which to discharge the at least one packet, (3) transmit the descriptor to a first egress queue associated with the first egress port, and (4) determine a suitability of the first egress port of the plurality of egress ports for discharging the at least one packet;

a crossbar in communication with the buffer and the plurality of egress ports and configured to transmit the at least one packet from the buffer to the first egress port; and requeuing circuitry disposed in the first egress port and configured to transmit the at least one packet to the buffer in an instance in which the control plane determines that the first egress port is not suitable for discharging the at least one packet.

22. The apparatus of claim 21, wherein in a circumstance in which the requeuing circuitry of the first egress port transmits the at least one packet to the buffer, the control plane is further configured to transmit the descriptor to a second egress queue associated with a second egress port.

23. The apparatus of claim 22, wherein the crossbar is further configured to transmit the at least one packet from the buffer to the second egress port.

24. The apparatus of claim 23, wherein the second egress port is the first available egress port of the plurality of egress ports.

25. The apparatus of claim 21, wherein each egress queue is configured to store the descriptor for a first amount of time.

26. A method comprising:
receiving at least one packet via an ingress port, the at least one packet comprising data and a header;
storing the at least one packet in a buffer;
determining a first egress port for receiving the at least one packet;
determining a descriptor associated with the at least one packet based on the header;
transmitting the descriptor to a first egress queue associated with the first egress port;
transmitting the descriptor to the first egress port;
transmitting the at least one packet from the buffer through a crossbar such that the at least one packet is routed to the first egress port;
determining a suitability of the first egress port for discharging the at least one packet; and
transmitting the at least one packet to the buffer in an instance in which the first egress port is not suitable for discharging the at least one packet.

27. The method of claim 26, wherein in a circumstance in which the at least one packet is transmitted to the buffer, the method further comprises transmitting the descriptor to a second egress queue associated with a second egress port.

28. The method of claim 27, further comprising:
transmitting the at least one packet from the buffer through the crossbar such that the at least one packet is routed to the second egress port.

29. The method of claim 28, wherein the second egress port is the first available egress port of a plurality of egress ports.

30. The method of claim 26, wherein each egress queue is configured to store the descriptor for a first amount of time.

* * * * *